(12) United States Patent
Matsuda et al.

(10) Patent No.: US 11,490,562 B2
(45) Date of Patent: Nov. 8, 2022

(54) GRASS MOWING WORK EVALUATION SYSTEM

(71) Applicant: Kubota Corporation, Osaka (JP)

(72) Inventors: Kazuaki Matsuda, Sakai (JP); Katsuhiko Uemura, Sakai (JP)

(73) Assignee: Kubota Corporation, Osaka (JP)

( * ) Notice: Subject to any disclaimer, the term of this patent is extended or adjusted under 35 U.S.C. 154(b) by 790 days.

(21) Appl. No.: 16/397,146

(22) Filed: Apr. 29, 2019

(65) Prior Publication Data

US 2019/0380265 A1 Dec. 19, 2019

(30) Foreign Application Priority Data

Jun. 13, 2018 (JP) .............................. JP2018-112796

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .............................. A01D 34/006; A01D 34/008
See application file for complete search history.

(56) References Cited

U.S. PATENT DOCUMENTS

| 5,940,346 A | * | 8/1999 | Sadowsky | ............... G01S 11/16 |
| | | | | 367/128 |
| 2002/0156556 A1 | * | 10/2002 | Ruffner | .................. A01D 42/00 |
| | | | | 318/587 |
| 2005/0053447 A1 | * | 3/2005 | Bucher | ................. E01C 19/004 |
| | | | | 411/470 |
| 2006/0059879 A1 | * | 3/2006 | Edmond | ................ A01D 34/78 |
| | | | | 56/6 |
| 2017/0020064 A1 | * | 1/2017 | Doughty | .............. A01D 34/008 |

FOREIGN PATENT DOCUMENTS

| CN | 102759924 A | * | 10/2012 | ........... A01D 34/008 |
| JP | 2017129939 A | | 7/2017 | |
| WO | WO-2007109624 A2 | * | 9/2007 | ........... A01D 34/008 |
| WO | WO-2015040987 A1 | * | 3/2015 | ........... A01D 34/008 |

* cited by examiner

*Primary Examiner* — Alicia Torres
(74) *Attorney, Agent, or Firm* — The Webb Law Firm

(57) ABSTRACT

A work evaluation system configured to effect evaluation of a grass mowing work performed by a work vehicle includes a state information acquisition section for acquiring vehicle state information indicative of a state of the work vehicle when performing the grass mowing work, a sound data acquisition section for acquiring sound data comprised of collection of sounds around the work vehicle, a foreign object amount calculation section for calculating an amount of foreign objects present in the work land which come into contact with a mowing blade in the course of the grass mowing work and an evaluation section for evaluating the grass mowing work performed in the work land, based on the vehicle state information and the foreign object amount.

4 Claims, 3 Drawing Sheets

GRASS MOWING WORK EVALUATION SYSTEM

CROSS-REFERENCE TO RELATED APPLICATION

This application claims priority to Japanese Patent Application No. 2018-112796 filed Jun. 13, 2018, the disclosure of which is hereby incorporated by reference in its entirety.

TECHNICAL FIELD

The present invention relates to a work evaluation system for carrying out evaluation of a grass mowing work performed by a work vehicle.

BACKGROUND ART

Conventionally, there has been contemplated a system for evaluating an agricultural work performed in a work land. As the technique of this type, one is known from e.g. Patent Document 1 identified below.

Patent Document 1 discloses an agricultural work evaluation system. This agricultural work evaluation system calculates, for each field, a score of an agricultural work, based on agricultural work data of agricultural works performed by an agricultural machine, and then displays such calculated score and/or evaluation set in correspondence with the score, on a display section.

BACKGROUND ART DOCUMENT

Patent Document

Patent Document 1: Japanese Unexamined Patent Application Publication No. 2017-129939.

SUMMARY OF THE INVENTION

Problem to be Solved by Invention

The technique disclosed in Patent Document 1 is explained therein by way of a tractor as an example of the agricultural machine. And, as the agricultural work data, information indicative of a moving distance, a moving speed or a position of the tractor is acquired. More particularly, in case a utility implement is a cultivator for instance, a rotational speed of a rotary unit, a load of the rotor unit, an engine rotational speed, a cultivation depth, a cultivation width, etc. are collected as the agricultural work data. Whereas, in case the implement is a fertilizer distributor, a pesticide sprayer, or a seeder, a spraying (distribution) amount (fertilizer distribution amount, pesticide spraying amount, seed distribution amount) or a spraying width, etc. will be collected as the agricultural work data. However, the agricultural work can also be a grass mowing work for mowing/cutting grass grown in the work land. As the technique disclosed in Patent Document 1 does not take such grass mowing work into consideration, there remains room for improvement.

Then, there is a need for a work evaluation system capable of appropriately evaluating a grass mowing work.

Solution

According to a characterizing feature of a work evaluation system relating to one embodiment of the present invention, there is provided a work evaluation system configured to effect evaluation of a grass mowing work performed by a work vehicle, the system comprising:

a state information acquisition section for acquiring vehicle state information indicative of a state of the work vehicle when performing the grass mowing work;

a sound data acquisition section for acquiring sound data comprised of collection of sounds around the work vehicle;

a foreign object amount calculation section for calculating an amount of foreign objects present in the work land which come into contact with a mowing blade in the course of the grass mowing work; and an evaluation section for evaluating the grass mowing work performed in the work land, based on the vehicle state information and the foreign object amount.

With the above-described characterizing feature, it is possible to automatically effect evaluation or grading of the grass mowing work with using various kinds of information, with clarification of evaluation criteria respecting the quality (good/poor) of the grass mowing work. Further, it becomes also possible to carry out the evaluation appropriately without relaying on experience in the evaluation of the grass mowing work quality. Moreover, in case a worker to perform the grass mowing work differs from a client (user) of the grass mowing work, the user can determine objectively a work rank (skill) of the work, on the basis of the result of evaluation on the worker. In this way, with the inventive work evaluation system, it becomes possible to evaluate a grass mowing work appropriately.

Preferably, the work evaluation system further comprises:

an instruction information acquisition section for acquiring instruction information to be inputted to a control unit for controlling a pair of left and right electric motors that drive a pair of left and right driving wheels of the work vehicle;

an acceleration information acquisition section for acquiring acceleration information indicative of an acceleration affecting the work vehicle;

a terrain condition determination section for determining a condition of the work land based on the instruction information and the acceleration information; and a difficulty calculation section for calculating difficulty of the grass mowing work in the work land, based on the condition of the work land and the foreign object amount.

With the above-described arrangement, it becomes possible to utilize the results of respective detections as "source data" for use in the evaluation or grading of the grass mowing work. Further, with clarification of the evaluation criteria for the difficulty of the work land, the evaluation of difficulty can be effected objectively and automatically, with using the various kinds of information. Moreover, even when the worker and the user (client) of the grass mowing work differ from each other, both the user and the worker can be informed of the difficulty of the work land.

Still preferably:

the vehicle state information is at least one of position information indicative of a position of the work vehicle, acceleration information indicative of acceleration affecting the work vehicle, rotational speed information indicative of a rotational speed(s) of the pair of left and right driving wheels of the work vehicle and an electric current value(s) of current(s) flowing in the pair of electric motors for driving the pair of left and right driving wheels; and the evaluation section effects the evaluation of the grass mowing work, based on the at least one information.

With the above-described arrangement, it becomes possible to utilize the results of respective detections as source data for use in the evaluation or grading of the grass mowing work and/or the determination of the difficulty.

Still preferably, the evaluation section can show the result of evaluation on the grass mowing work in the form of a rank or a score.

With the above-described arrangement, the evaluation of the grass mowing work can be carried out easily and appropriately.

MODE OF EMBODYING THE INVENTION

A work evaluation system relating to the present invention is configured to be able to effect evaluation of a grass mowing work performed by a work vehicle. Next, a work evaluation system 200 (see FIG. 3) relating to this embodiment will be explained.

Figure 1:
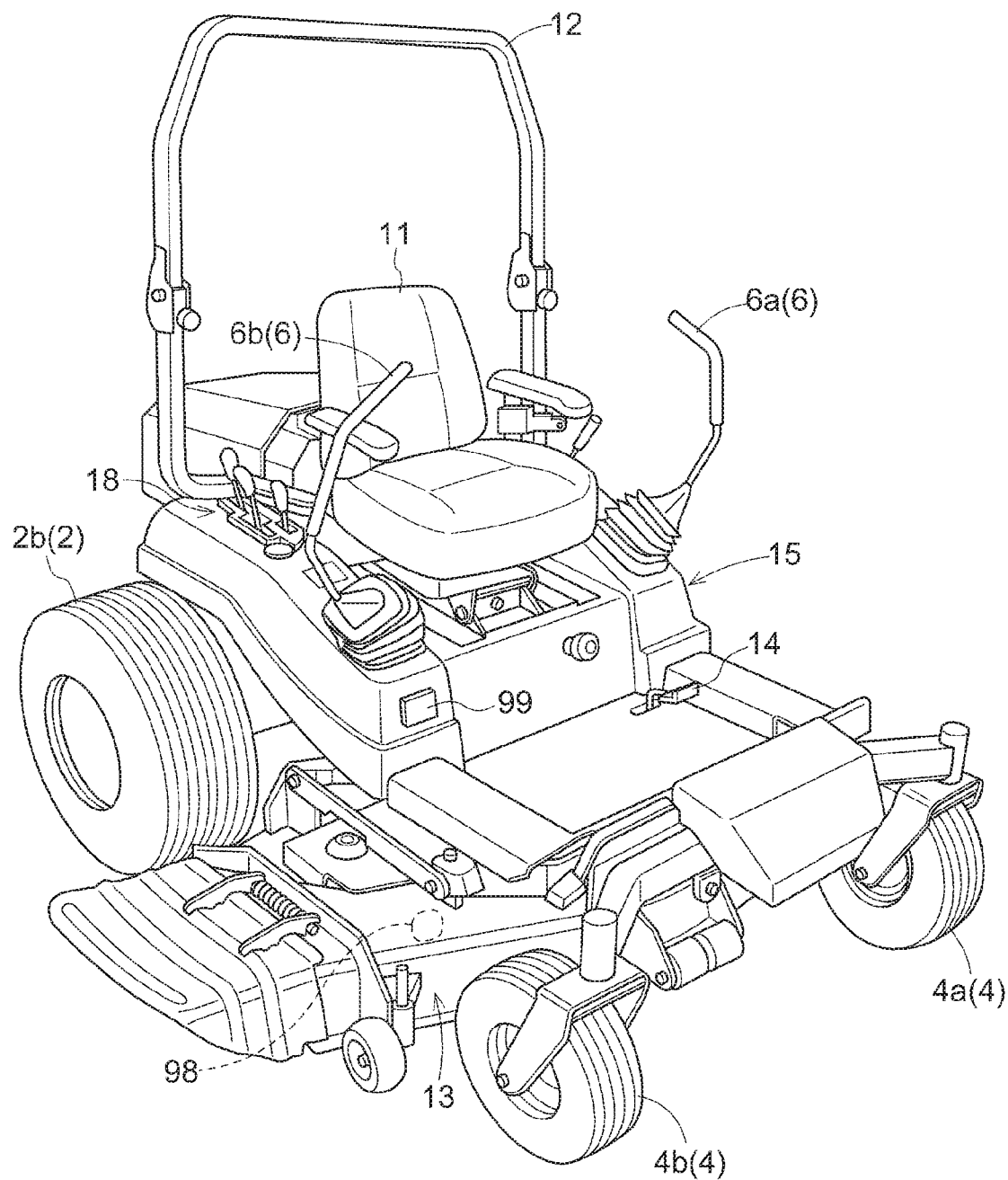
FIG. 1 is a perspective view showing a work vehicle which performs a grass mowing work as a subject of evaluation.
Figure 2:
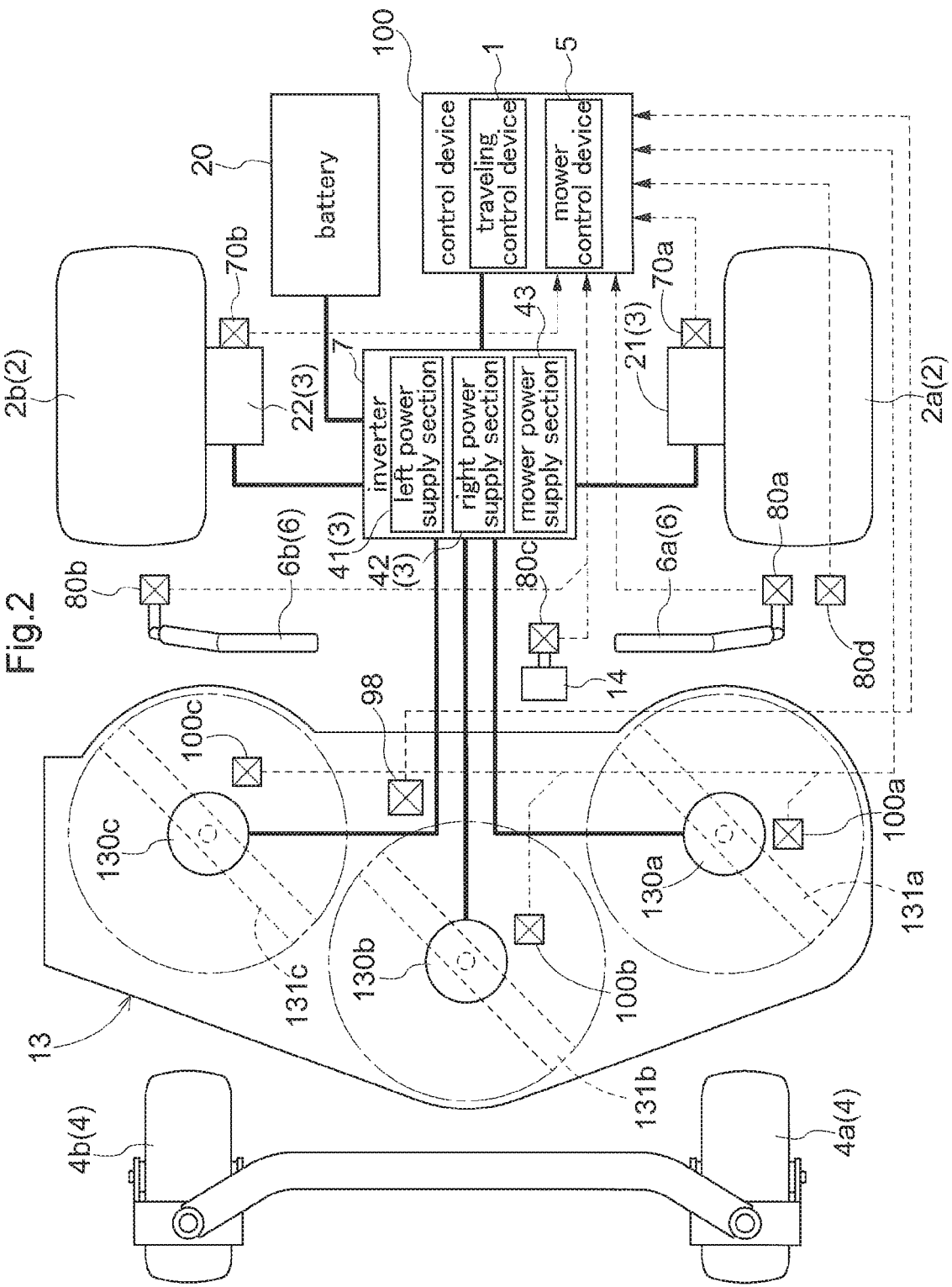
FIG. 2 is a system diagram showing an electric system and a power system of the work vehicle.

FIG. 1 shows a perspective view showing a riding electrically powered grass mowing vehicle as one example of the work vehicle to perform a grass mowing work as a subject of evaluation carried out by the work evaluation system 200 (see FIG. 3) relating to the instant embodiment. Also, FIG. 2 shows a system diagram of an electric system and a power system. As shown in FIG. 1 and FIG. 2, the riding electrically powered grass mowing vehicle (machine) includes a vehicle body 15 supported by caster wheels 4 as front wheels and driving wheels 2 as rear wheels, a battery 20 disposed at a rear portion of the vehicle body 15, a driver's seat 11 disposed forwardly of the battery 20, a ROPS (Roll-Over Protection System) frame 12 mounted erect from the rear side of the driver's seat 11, and a mower unit 13 suspended from the vehicle body 15 to be liftable up/down via a lift link mechanism in a space below the vehicle body 15 between the caster wheels 4 and the driving wheels 2. The driving wheels 2 are driven by a traveling control unit 3 whose operations are controlled by a traveling control device 1. The mower unit 13 has its operations controlled by a mower control device 5. Here, the caster wheels 4 consist of a left caster wheel 4a and a right caster wheel 4b and the driving wheels 2 consist of a left driving wheel 2a and a right driving wheel 2b.

Forwardly of the driver's seat 11, a floor plate is provided as a footrest for the driver, from which a brake pedal 14 protrudes. On the opposed lateral sides of the driver's seat 11, there are disposed a left maneuvering lever 6a and a right maneuvering lever 6b. Further, laterally of the driver's seat 11, there is provided an electric control panel 18 including switch buttons, switch levers, etc. of the electric system. On this electric control panel 18, there is also disposed a mower switch for activating the mower unit 13. Incidentally, in the following discussion, the above-described left maneuvering lever 6a and the right maneuvering lever 6b will be collectively referred to as "the maneuvering lever 6" wherever no distinction therebetween is needed.

In the instant embodiment, the left driving wheel 2a and the right driving wheel 2b respectively receive rotational power from a left motor 21 and a right motor 22 as their power supply source. The left motor 21 is supplied with electric power via a left power supply section 41 constituting an inverter 7 and the right motor 22 is supplied with electric power via a right power supply section 42 constituting the inverter 7. By varying the electric powers supplied respectively thereto, it is possible to vary at least one of a rotational speed and a torque, so that rotational speeds (circumferential speeds) of the left driving wheel 2a and the right driving wheel 2b can be made different from each other, so that a turn of the riding electrically powered grass mowing vehicle can be realized due to a rotational speed difference between the left driving wheel 2a and the right driving wheel 2b.

The traveling control unit 3 is a functional section for controlling traveling and turning of the riding electrically powered grass mowing vehicle and includes, in this embodiment, the left motor 21, the right motor 22, and the inverter 7 (in particular, the left power supply section 41 and the right power supply section 42). The inverter 7 supplies power to the left motor 21 and the right motor 22, respectively. Power outputted from the invertor 7 corresponds to a speed instruction value (target value) calculated by the traveling control device 1. In this, if an actual rotational speed (actual speed) becomes smaller than such target value, this power will be corrected so as to increase the motor output torque. On the other hand, in the course of traveling on a downslope, for instance, if the actual rotational speed (actual speed) becomes greater than the target value, the power will be corrected so as to decrease the motor output torque.

The mower unit 13 includes three rotary blades 131a, 131b, 131c corresponding to mowing (or cutting) blades.

These rotary blades 131a, 131b, 131c receive power for their driving from respective mower motors 130a, 130b, 130c. The mower motors 130a, 130b, 130c receive supply of power via a mower power supply section 43 constituting the inverter 7. The mower power supply section 43 is controlled by the mower control device 5. This mower control device 5, together with the traveling control device 1 described above, constitutes a control device 100.

An operational amount (pivot angle) of the left maneuvering lever 6a is detected by a left maneuvering angle detection sensor 80a. An operational amount (pivot angle) of the right maneuvering lever 6b is detected by a right maneuvering angle detection sensor 80b. Also, an operational angle of the brake pedal 14 is detected by a brake detection sensor 80c and an operation of the mower switch is detected by a mower sensor 80d. Further, a rotational speed of the left driving wheel 2a is detected by a left rear wheel rotation detection sensor 70a and a rotational speed of the right driving wheel 2b is detected by a right rear wheel rotation detection sensor 70b. And, rotational speeds of the mower motors 130a, 130b, 130c are detected by respective rotation sensors 100a, 100b, 100c. The detection results of these respective sensors will be forwarded to the control device 100 to be utilized appropriately by the traveling control device 1 and the mower control device 5.

In the traveling control device 1, target rotational speeds for the left driving wheel 2a and the right driving wheel 2b are calculated, based on the operational amounts of the maneuvering levers 6 detected respectively by the left maneuvering angle detection sensor 80a and the right maneuvering angle detection sensor 80b. Further, from the respective target rotational speeds, power mounts to be supplied respectively to the left motor 21 and the right motor 22 are calculated. Then, the traveling control device 1 will drive the left motor 21 and the right motor 22, according to these calculated power amounts. Here, depending on a traveling condition, it may occur that the actual rotational speed of the driving wheel 2 does not agree with the target rotational speed which is controlled based on an operational amount of the maneuvering lever 6. In such case, with use of a known feedback control scheme, the traveling control device 1 will make adjustment of the above-described electric power so as to bring the actual rotational speed of the driving wheel 2 into agreement with the target rotational speed based on the operational amount of the maneuvering lever 6. In this, the traveling control device 1 will calculate required driving torques (to be referred to simply as "required torque" hereinafter) required by the left motor 21 and the right motor 22. Here, the language "required torque" means an amount of torque required by the left motor 21 or the right motor 22 in order to make the actual rotational speed the target rotational speed in case the former fails to reach the latter. The traveling control device 1 calculates such required torques, from the target rotational speeds of the left driving wheel 2a and the right driving wheel 2b based on the detection results of the left maneuvering angle detection sensor 80a and the right maneuvering angle detection sensor 80b and the actual rotational speeds of the left driving wheel 2a and the right driving wheel 2b obtained by the left rear wheel rotation detection sensor 70a and the right rear wheel rotation detection sensor 70b. Then, the traveling control device 1 corrects the electric power amounts based on the calculated required torques.

Further, the vehicle body 15 mounts a GPS module 99 which is configured as a GNSS module. This GPS module 99 includes a GPS antenna for receiving a GPS signal or a GNSS signal ("GPS signal" in this embodiment). Incidentally, the GPS module 99 can include an inertial navigation module incorporating a gyro acceleration sensor or a magnetic positioning sensor in order to complement the satellite navigation technique. Of course, such inertial navigation module can be provided at a location separately from the GPS module 99. The GPS signal acquired by the GPS module 99 will be used when the riding electrically powered grass mowing vehicle effects an autonomous traveling and will be used as "position information" in various functional sections to be described later.

Figure 3:
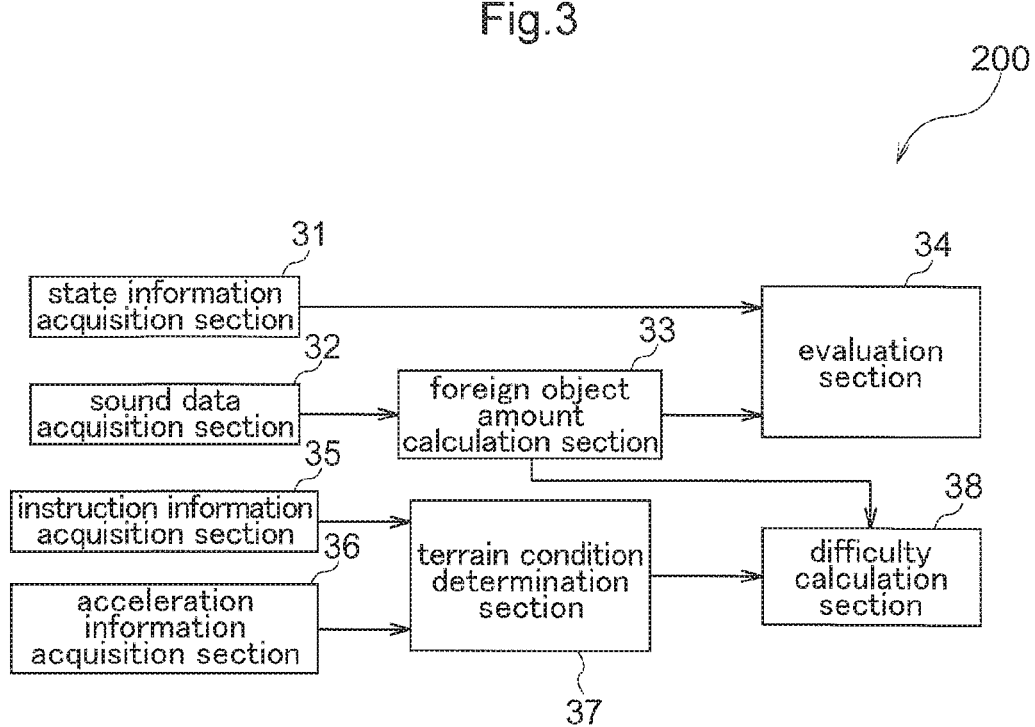
FIG. 3 is a block diagram showing a configuration of a work evaluation system.

FIG. 3 is a block diagram schematically showing the configuration of the work evaluation system 200. As shown in this FIG. 3, the work evaluation system 200 includes respective sections of: a state information acquisition section 31, a sound data acquisition section 32, a foreign object amount calculation section 33, an evaluation section 34, an instruction information acquisition section 35, an acceleration information acquisition section 36, a terrain condition determination section 37, and a difficulty calculation section 38. These respective functional sections are constituted of hardware and/or software with a CPU as its core component, in order to carry out various processes relating to evaluation of the grass mowing work.

This work evaluation system 200 can be configured as a management terminal (e.g. a management server) provided separately from the work vehicle. In such case, advantageously, an arrangement will be provided such that reception and transmission of various kinds of data (information) be effected between the work evaluation system 200 and the control device 100 of the work vehicle at least via either one of wireless transmission and wired transmission. Needless to say, the work evaluation system 200 can be incorporated within the work vehicle.

As shown in FIG. 2 and FIG. 3, the state information acquisition section 31 acquires vehicle state information indicative of a state of the work vehicle when engaged in a grass mowing work. Here, the language "a state of the work vehicle when engaged in a grass mowing work" means a state of the riding electrically powered grass mowing vehicle when it is performing a grass mowing work and operational states of the respective functional sections of this riding electrically powered grass mowing vehicle.

More particularly, in the instant embodiment, the vehicle state information corresponds to position information indicative of the position of the work vehicle, acceleration information indicative of an acceleration affecting the work vehicle, rotational speed information indicative of rotational speeds of the pair of left and right driving wheels 2 of the work vehicle, current values of electric currents flowing in the pair of left and right motors (the left motor 21 and the right motor 22) which drive the pair of left and right driving wheels 2.

The position information indicative of the position of the work vehicle is information which is defined via a latitude, a longitude and an altitude of the work vehicle and this is acquired based on the GPS signal received by the GPS module 99 described above. The acceleration information indicative of an acceleration affecting the work vehicle refers to an acceleration of the riding electrically powered grass mowing vehicle at the time of its traveling and this is detected by an acceleration sensor (a G sensor). The rotational speed information indicative of rotational speeds of the pair or left and right driving wheels 2 of the work vehicle refers to the respective rotational speeds of the left driving wheel 2a and the right driving wheel 2b and in this embodiment, the rotational speed of the left driving wheel 2a is detected by the left rear wheel rotation detection sensor 70a and the rotational speed of the right driving wheel 2b is detected by the right rear wheel rotation detection sensor 70b. Advantageously, such rotational speed can include information of rotational direction also. The current values of electric currents flowing in the pair of left and right electric motors (the left motor 21 and the right motor 22) for driving the pair of left and right driving wheels 2 are current values of electric currents flowing in the respective coils of the left motor 21 and the right motor 22 in order to cause these left and right motors 21, 22 to output rotational powers respectively and these current values are detected by current sensors. These vehicle state information will be transmitted to an evaluation section 34 which will be described later. Further, rotational speeds of the mower motors 130a, 130b, 130c too can be used as information indicative of an operational state (s). Then, advantageously, the state information acquisition section 31 can acquire these information via wireless communication from the control device 100, for example.

The sound data acquisition section 32 acquires sound data comprised of sounds collected from around the work vehicle. Here, the language "sounds collected from around the work vehicle" refer to a traveling sound of the riding electrically powered grass mowing vehicle and a working sound of this work vehicle. The traveling sound of the riding electrically powered grass mowing vehicle refers a sound which is generated e.g. when the driving wheels 2 ride over an object in the course of traveling or a sound which is generated due to collision of the vehicle body 15 or the mower unit 13 against some object. The working sound of the riding electrically powered grass mowing vehicle refers to a sound generated from hitting of a foreign object such as a stone against the rotary blade 131a, 131b, 131c during rotation thereof. Such sounds will be acquired by a sound collecting microphone 98 (for the following, see FIG. 1 and FIG. 2) included in the mower unit 13 and will be transmitted to the sound data acquisition section 32. Sound data acquired by the sound data acquisition section 32 are transmitted to the foreign object amount calculation section 33 to be described later. Here, the sound collection microphone 98 can alternatively be attached to a frame (mower deck) of the mower unit 13. Still alternatively, the sound collection microphone 98 can be attached to the surface of the mower deck or included therein. Advantageously, the sound data acquisition section 32 can be configured to acquire the sound data from the control device 100 via wireless communication for example.

The foreign object amount calculation section 33 calculates an amount of foreign objects which are present in the work land and come into contact with the mowing blade in the course of a grass mowing work. Sound data will be transmitted from the sound data acquisition section 32 as described above. The foreign object amount calculation section 33 analyzes the sound data (via e.g. frequency analysis) and estimates the composition of the foreign object (or matter), sizes, the amount (many or few) of the objects and then based on the result of this estimation, calculates the amount of foreign objects present in an area where a grass mowing work has been performed in the work land. In this, the foreign object amount calculation section 33 can determine presence/absence of vibration in the mower deck based on the sound data and then calculate the amount of foreign objects based on the magnitude of such vibration. The foreign object amount calculated by the foreign object amount calculation section 33 will be transmitted to the evaluation section 34 as foreign object amount information.

Then, based on the vehicle state information and the foreign object amount described above, the evaluation section 34 will carry out evaluation of the grass mowing work performed in the work land. The vehicle state information will be forwarded from the state information acquisition section 31. The foreign object amount will be included in the foreign object amount information forwarded from the foreign object amount calculation section 33. Here, "evaluation of the grass mowing work" refers to giving a rank or a score to the grass mowing work performed in the work land. Then, via such evaluation, it becomes readily possible to evaluate the quality (good/poor) of the grass mowing work and to calculate a wage for the client of the grass mowing work with using such evaluation result.

Further, in this embodiment, the work evaluation system 200 has a function of evaluating difficulty of the work land where the grass mowing work has been performed. This function is realized by the respective functional sections of the instruction information acquisition section 35, the acceleration information acquisition section 36, the terrain condition determination section 37, the difficulty calculation section 38 and the foreign object amount calculation section 33.

The instruction information acquisition section 35 acquires instruction information to be inputted to the control unit which controls the pair of left and right electric motors (the left motor 21 and the right motor 22) for driving the pair of left and right driving wheels 2 of the work vehicle. Here, the pair of left and right driving wheels 2 of the work vehicle refer to the left driving wheel 2a and the right driving wheel 2b of the riding electrically powered grass mowing vehicle. The control unit for controlling the pair of left and right electric motors (the left motor 21 and the right motor 22) refers to the traveling control device 1. The instruction information to be inputted to the control unit refers to information comprised of an operational amount (pivoting angle) of the left maneuvering lever 6a detected by the left maneuvering angle detection sensor 80a and an operational amount (pivoting angle) of the right maneuvering lever 6b detected by the right maneuvering angle detection sensor 80b. Thus, the instruction information acquisition section 35 acquires the information comprised of an operational amount (pivoting angle) of the left maneuvering lever 6a detected by the left maneuvering angle detection sensor 80a and an operational amount (pivoting angle) of the right maneuvering lever 6b detected by the right maneuvering angle detection sensor 80b which will be inputted to the traveling control section 1 that controls the left motor 21 and the right motor 22 for driving the left driving wheel 2a and the right driving wheel 2b respectively of the riding electrically powered grass mowing vehicle. The instruction information acquired by the instruction information acquisition section 35 is transmitted to the terrain condition determination section 37 to be described later. Advantageously, this instruction information acquisition section 35 can be configured to acquire such instruction information from the control device 100 via wireless communication.

The acceleration information acquisition section 36 acquires acceleration information indicative of an acceleration affecting the work vehicle. Here, the above language "acceleration information indicative of an acceleration affecting the work vehicle" refers to an acceleration of the riding electrically powered grass mowing vehicle at the time of its traveling and is detected by an acceleration sensor (a G sensor). Advantageously, such acceleration can be detected for the yaw, the pitch and the roll, respectively. The acceleration information acquisition section 36 acquires the traveling acceleration of the riding electrically powered grass mowing vehicle from the acceleration sensor and transmits this to the terrain condition determination section 37 which will be described later.

The terrain condition determination section 37 determines a condition of the work land, based on the instruction information and the acceleration information. The instruction information is transmitted from the instruction information acquisition section 35. The acceleration information is transmitted from the acceleration information acquisition section 36. Here, "a condition of the work land" is a condition specified by a slope of the work land, a height of unevenness of the work land, a depth of a recess in the work land, a degree of slipperiness of the work land, presence/absence of mud in the work land, etc. The terrain condition determination section 37 determines such condition of the work land, based on the instruction information and the acceleration information and forwards the result of this determination to the difficulty calculation section 38. Incidentally, the terrain condition determination section 37 can alternatively be configured to effect such determination based on a captured image capturing the work land. In such case, advantageously, a camera can be mounted on the vehicle body 15 (see FIG. 1).

The difficulty calculation section 38 calculates (a degree of) difficulty of the grass mowing work in the work land, based on the condition of the work land and the foreign object amount. The condition of the work land will be transmitted as determination result from the terrain condition determination section 37. The foreign object amount will be transmitted as the foreign object amount information from the foreign object amount calculation section 33. Here, the difficulty (degree) of the grass mowing work in the work land means an index of difficulty (or readiness) of the grass mowing work. Thus, the difficulty calculation section 38 calculates such difficulty as an index of the difficulty (readiness) of the grass mowing work, from the determination result transmitted from the terrain condition determination section 37 and the foreign object amount information transmitted from the foreign object amount calculation section 33.

Incidentally, it is also possible to arrange such that the difficulty be calculated with additional use of the sound data collected by the sound collection microphone 98 and acquired by the sound data acquisition section 32.

As the difficulty of the grass mowing work calculated by the difficulty calculation section 38 and the evaluation of the grass mowing work effected by the evaluation section 34 are taken into consideration, it becomes possible to effect evaluation of the quality (good/poor) of the grass mowing work or to calculate a wage (or a charge) for the user (client) of the grass mowing work easily and more accurately, with using such evaluation result.

Further, as the difficulty of the grass mowing work is informed to the user, selectively, a skilled worker can be assigned to perform a work in a work land of high difficulty whereas a beginner or unskilled worker can be assigned to perform a work land of low difficulty. In such case, improvement of efficiency of the agricultural business as a whole can be expected. And, it is also possible to arrange such that the work evaluation system 200 carry out such selective assignment of work automatically in accordance with the determination of the difficulty of the work land a result of evaluation of the worker effected by the evaluation section 34 (e.g. result of evaluation of works performed so far).

Moreover, advantageously, the work evaluation system 200 can be provided with a display device (a monitor) for displaying a grading result, and advice according to such grading result. In such case, the worker can recognize the evaluation result and/or the grading result and can obtain such advice also. Consequently, based on this advice, improvement of the work can be expected. Furthermore, as the worker may strive to obtain a higher score or workers compete among each other, the work can be enjoyed like a game.

Further, advantageously, the work evaluation system 200 can be provided with a management terminal configured to collect the data of the score of the work and/or the difficulty of the work land and process them. Then, a grading result or advice for each individual worker and difficulty of the work land can be confirmed via an operational terminal or a mobile terminal via wireless communication. Alternatively, such management terminal can be configured to collect the evaluation results collected so far and the calculation results of difficulty obtained so far and to process them. With this, it becomes also possible to cause the worker to be well-versed in ranks or the like in all works. Moreover, it becomes also possible to give advice to a person of lower rank, with reference to a method or technique of work performed by a person with higher rank.

Advantageously, the score of the work can be calculated in manners as follows for instance.

(1) Of position information acquired by predetermined time intervals (e.g. every 3 seconds), positions indicated by a plurality (e.g. three) of position information acquired immediately before are plotted on a two-dimensional coordinates system and a point is added if these plots (e.g. the three points) are aligned linearly.

(2) A point is added if a variation in the detection result of the acceleration sensor (e.g. variation in the yaw rate) is contained within a predetermined range (threshold value) for a predetermined period (e.g. 3 seconds).

(3) A point is added if a rotational speed difference between the left motor 21 and the right motor 22 for every predetermined period (e.g. every 5 seconds) is confined within a predetermined range (threshold value).

(4) Based on the information of the respective rotational speeds and rotational directions of the left motor 21 and the right motor 22 for every predetermined period (e.g. every 1 second), at the time of execution of a zero-turn (a spin turn), if one of the left driving wheel 2a and the right driving wheel 2b is under a condition near a zero speed and the other is being rotated, a point is subtracted.

(5) A point is subtracted if electric currents or regenerative currents supplied to the left motor 21 and the right motor 22 exceed a predetermined threshold value, as this is taken as execution of a sudden acceleration/deceleration.

Other Embodiments

In the foregoing embodiment, it was explained that the work evaluation system 200 includes the instruction information acquisition section 35, the acceleration information acquisition section 36, the terrain condition determination section 37 and the difficulty calculation section 38. However, the work evaluation system 200 can be configured without including the instruction information acquisition section 35, the acceleration information acquisition section 36, the terrain condition determination section 37 and the difficulty calculation section 38.

In the foregoing embodiment, it was explained that the vehicle state information comprises the position information indicative of the position of the work vehicle, the acceleration information indicative of an acceleration affecting the work vehicle, the rotational speed information indicative of rotational speeds of the pair of left and right driving wheels 2 of the work vehicle and electric current values of currents flowing in the pair of left and right motors for driving the pair of left and right driving wheels 2. However, alternatively, the vehicle state information can comprise at least one of these kinds of information. In such case, advantageously, the evaluation section 34 can be configured to effect the evaluation of the grass mowing work based on such at least one kind of information. Further, the vehicle state information can be any other information then the kinds of information described above.

In the foregoing embodiment, it was explained that traveling of the riding electrically powered grass mowing vehicle is controlled based on operational amounts of the maneuvering levers 6. However, the riding electrically powered grass mowing vehicle can be provided with a steering wheel, instead of the maneuvering levers 6. In such case, traveling of the riding electrically powered grass mowing vehicle will be controlled based on an operational amount of the steering wheel.

The present invention is applicable to a work evaluation system for carrying out evaluation of a grass mowing work performed by a work vehicle.

DESCRIPTION OF SIGNS

31: state information acquisition section
32: sound data acquisition section
33: foreign object amount calculation section
34: evaluation section
35: instruction information acquisition section
36: acceleration information acquisition section 37: terrain condition determination section
38: difficulty calculation section
200: work evaluation system

The invention claimed is:

1. A work evaluation system configured to effect evaluation of a grass mowing work performed by a work vehicle, the system comprising:
   a state information acquisition section for acquiring vehicle state information indicative of a state of the work vehicle when performing the grass mowing work;
   a sound data acquisition section for acquiring sound data comprised of a collection of sounds around the work vehicle generated by a mowing blade of the work vehicle contacting objects during the grass mowing work;
   a foreign object amount calculation section for calculating, based on the sound data, an amount of foreign objects present in a work land which come into contact with the mowing blade of the work vehicle in the course of the grass mowing work; and
   an evaluation section for evaluating a quality of the grass mowing work performed in the work land, the quality associated with good or poor work, based on the vehicle state information and the foreign object amount.

2. The work evaluation system of claim 1, further comprising:
   an instruction information acquisition section for acquiring instruction information to be inputted to a control unit for controlling a pair of left and right electric motors that drive a pair of left and right driving wheels of the work vehicle;
   an acceleration information acquisition section for acquiring acceleration information indicative of an acceleration affecting the work vehicle;
   a terrain condition determination section for determining a condition of the work land based on the instruction information and the acceleration information; and
   a difficulty calculation section for calculating difficulty of the grass mowing work in the work land, based on the condition of the work land and the foreign object amount.

3. The work evaluation system of claim 1, wherein:
   the vehicle state information is at least one of: position information indicative of a position of the work vehicle; acceleration information indicative of acceleration affecting the work vehicle; rotational speed information indicative of at least one rotational speed of a pair of left and right driving wheels of the work vehicle; and at least one electric current value of current flowing in a pair of electric motors for driving the pair of left and right driving wheels; and
   the evaluation section effects the evaluation of the grass mowing work, based on the at least one information.

4. The work evaluation system of claim 1, wherein the evaluation section shows the result of evaluation on the grass mowing work in the form of a rank or a score.

\* \* \* \* \*